United States Patent
Lee et al.

(10) Patent No.: US 12,455,816 B2
(45) Date of Patent: Oct. 28, 2025

(54) METHOD AND SYSTEM FOR UPDATING FILE IN FILE SYSTEM USING A REMAP COMMAND

(71) Applicant: RESEARCH & BUSINESS FOUNDATION SUNGKYUNKWAN UNIVERSITY, Suwon-si (KR)

(72) Inventors: Sang-Won Lee, Gyeonggi-do (KR); Jonghyeok Park, Gyeonggi-do (KR); Young Ik Eom, Gyeonggi-do (KR); Dongkun Shin, Gyeonggi-do (KR); Yongmyung Lee, Gyeonggi-do (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/364,042

(22) Filed: Aug. 2, 2023

(65) Prior Publication Data

US 2024/0232069 A1   Jul. 11, 2024

(30) Foreign Application Priority Data

Jan. 10, 2023   (KR) .......................... 10-2023-0003527

(51) Int. Cl.
*G06F 12/02* (2006.01)
*G06F 16/11* (2019.01)

(52) U.S. Cl.
CPC .......... *G06F 12/0246* (2013.01); *G06F 16/11* (2019.01); *G06F 2212/7201* (2013.01)

(58) Field of Classification Search
CPC ................. G06F 12/0246; G06F 16/11; G06F 2212/7201
See application file for complete search history.

(56) References Cited

U.S. PATENT DOCUMENTS

| | | |
|---|---|---|
| 8,902,649 B2 | 12/2014 | Ryu |
| 11,262,919 B2 | 3/2022 | Wang et al. |
| 11,836,117 B2 | 12/2023 | Yoon et al. |
| 2014/0095552 A1 | 4/2014 | Hwang et al. |
| 2014/0095803 A1 | 4/2014 | Kim et al. |
| 2020/0394136 A1* | 12/2020 | Byun .................. G06F 12/0253 |
| 2024/0201898 A1* | 6/2024 | Lee ....................... G06F 3/0683 |

FOREIGN PATENT DOCUMENTS

| | | |
|---|---|---|
| KR | 10-2013-0050591 A | 5/2013 |
| KR | 10-1979715 B1 | 5/2019 |
| KR | 10-2002830 B1 | 7/2019 |
| KR | 10-2022-0037184 A | 3/2022 |

OTHER PUBLICATIONS

Yongmyung Lee et al., "When F2FS Meets Address Remapping", HotStorage, 22, Jun. 27-28, 2022, Virtual Event, USA, pp. 31-36.
Korean Office Action dated Apr. 11, 2025 in Application No. 10-2023-003527.

* cited by examiner

*Primary Examiner* — Jane W Benner
(74) *Attorney, Agent, or Firm* — Sughrue Mion, PLLC

(57) ABSTRACT

Provided is a file system including a sequential-writing unit configured to perform sequential write to a new block position of a segment when updating a data block, an updating unit configured to update a page mapping table by mapping a logical page number newly allocated to the new block position and a physical page number newly allocated corresponding thereto, and a remapping unit configured to modify the page mapping table by applying a remap command.

13 Claims, 8 Drawing Sheets

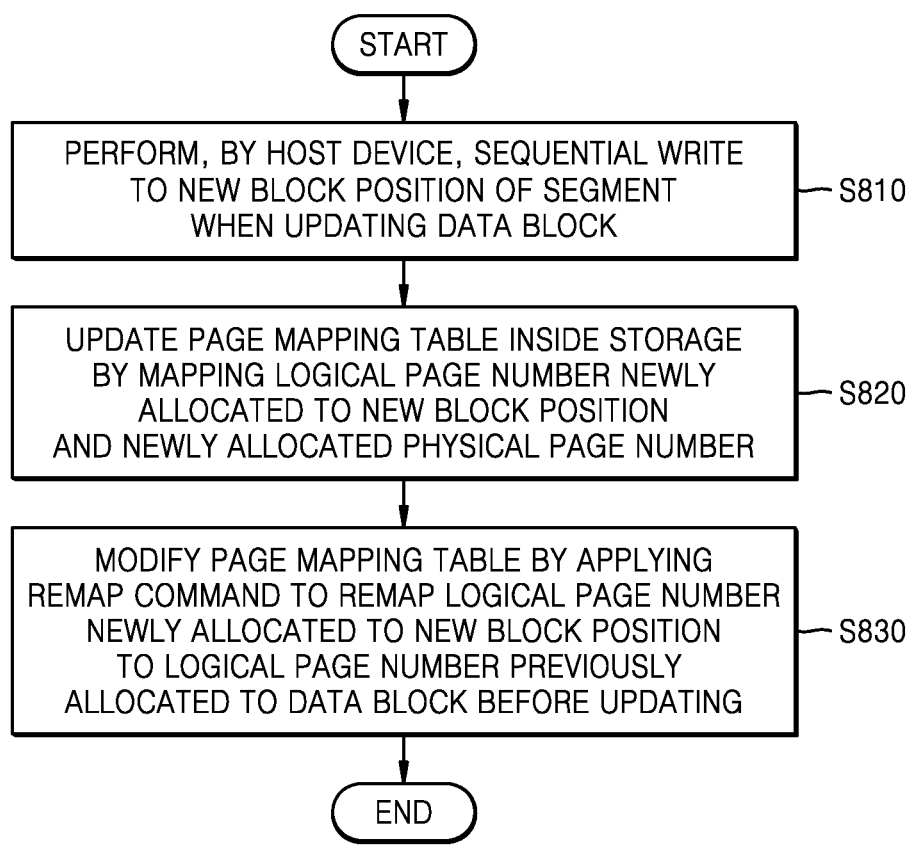

METHOD AND SYSTEM FOR UPDATING FILE IN FILE SYSTEM USING A REMAP COMMAND

CROSS-REFERENCE TO RELATED APPLICATIONS

This application is based on and claims priority under 35 U.S.C. § 119 to Korean Patent Application No. 10-2023-0003527, filed on Jan. 10, 2023, in the Korean Intellectual Property Office, the disclosure of which is incorporated by reference herein in its entirety.

BACKGROUND

1. Field

The disclosure relates to a method of updating a file in a file system. More specifically, the disclosure relates to a method of updating a file by using a remap command.

2. Description of the Related Art

File systems update data structures to keep track of the latest version of a file. Log-structured file systems (LFSs) do not overwrite (in-place update) the current position of a file block when updating the file block, but perform out-of-place update at a position of a new block in a segment in a sequential write manner by being assigned with a segment that is in use or a new segment. Thus, when the file block is updated, it is necessary to update a metadata block that records a block address for reflecting the position of the new block. The metadata block also performs sequential write on a new segment instead of overwriting an existing block. When a 4 KB data block is updated, additional update of a 4 KB metadata block is required. In this process, a segment is consumed rapidly. When all segments are consumed, the file system may secure a new segment by performing segment cleaning but increase a segment cleaning overhead cost.

SUMMARY

The disclosure aims to solve a problem of having to update a metadata block each time when a file block is updated to a position of a new block (out-of-place update) in a file system.

The disclosure also separately performs an update operation (an update-block-operation) and a new write operation (an append-block-operation) for a data block on a hot segment and a cold segment in a file system, thereby minimizing a segment cleaning overhead problem.

Moreover, the disclosure aims to solve a file fragmentation problem occurring with random block update.

Additional aspects will be set forth in part in the description which follows and, in part, will be apparent from the description, or may be learned by practice of the presented embodiments of the disclosure.

According to an aspect of the disclosure, a method of updating a file in a file system includes placing, by a sequential-writing unit, a new block in a cold segment and an update block in a hot segment, and performing sequential write respectively on the new block and the update block, updating, by an updating unit, a page mapping table by mapping a logical page number newly allocated to a new block position in the hot segment where the update block is written and a physical page number newly allocated corresponding thereto, and modifying, by a remapping unit, the page mapping table by applying a remap command to remap the logical page number newly allocated to the update block to a logical page number previously allocated before the update block is updated.

In an embodiment, the hot segment may be invalidated after applying the remap command.

In an embodiment, when there are a plurality of update blocks, with one remap command, a logical page number newly allocated to each of a plurality of new block positions in the hot segment where the plurality of update blocks are written may be remapped to each logical page number previously allocated to a data block before the plurality of update blocks are updated.

According to another aspect of the disclosure, a method of updating a file in a file system includes performing, by a sequential-writing unit, sequential write to a new block position of a segment when updating a data block, updating, by an updating unit, a page mapping table by mapping a logical page number newly allocated to the new block position and a physical page number newly allocated corresponding thereto, and modifying, by a remapping unit, the page mapping table by applying a remap command to a storage to remap the logical page number newly allocated to the new block position to a logical page number previously allocated to the data block, the remap command being performed before updating a metadata block that records a change of a logical page number of the new block.

In an embodiment, the sequential-writing unit may separately manage a hot segment and a cold segment.

According to another aspect of the disclosure, a file system includes a sequential-writing unit configured to perform sequential write to a new block position of a segment when updating a data block, an updating unit configured to update a page mapping table by mapping a logical page number newly allocated to the new block position and a physical page number newly allocated corresponding thereto, and a remapping unit configured to modify the page mapping table by applying a remap command to a storage to remap the logical page number newly allocated to the new block position to a logical page number previously allocated to the data block.

In an embodiment, the remap command may be performed before a metadata block that records a change of a logical page number of the new block is updated after the data block is updated.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a flowchart of updating a file in a file system, according to an embodiment.

DETAILED DESCRIPTION

Figure 1:
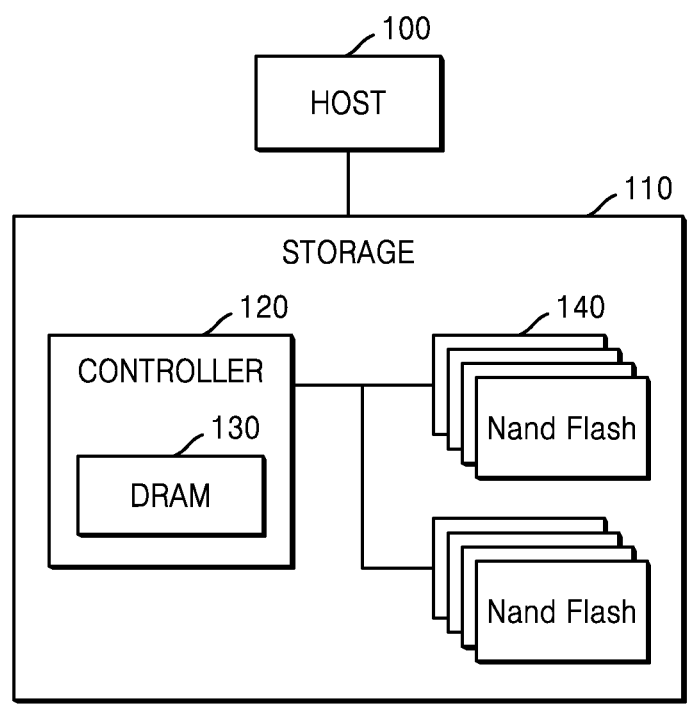
FIG. 1 shows an example where a host device is connected to a storage, according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of components, modify the entire list of components and do not modify the individual components of the list.

Hereinafter, a description will be made with reference to the drawings.

FIG. 1 shows an example of a host device according to an embodiment. An example of a host device 100 may include a computer, a mobile phone, a handheld device, a wearable device, a smart watch, etc., where a log-structured file system (LFS) is used. The LFS may divide a disk volume into segments 310, 320, and 330 and perform sequential write operations 321, 322, 323, and 324 on internal blocks in segment units, as in an example of FIG. 3. An example of a size of a block may be 4 KB, and an example of a size of a segment may be 2 MB. The LFS may include a flash-friendly file system (F2FS).

The host device 100 may be connected to a storage 110. In an embodiment, it is assumed that the storage 110 having a page mapping table is used. The storage 110 may include a controller 120 and a non-volatile memory 140. An example of the controller 120 may include a solid state drive (SSD) controller. The controller 120 may further include dynamic random access memory (DRAM) 130. The controller 120 and the DRAM 130 may be integrated into a single semiconductor device and implemented in the form of a memory card. For example, the controller 120 and the DRAM 130 may constitute an SSD, a hard disk drive (HDD), or a universal flash storage (UFS). An example of the non-volatile memory 140 may be NAND flash memory. The non-volatile memory 140 may include a page mapping table therein.

A page mapping table 490 (see FIG. 4) may map a logical page number allocated to a block in a segment, and a logical page number newly allocated respectively to a new block position allocated to a storage and a newly allocated physical page number.

Upon receiving a request from the host device 100, the controller 120 may access the non-volatile memory 140. The controller 120 may control read, write, erase, and background operations of the nonvolatile memory 140.

Figure 3:
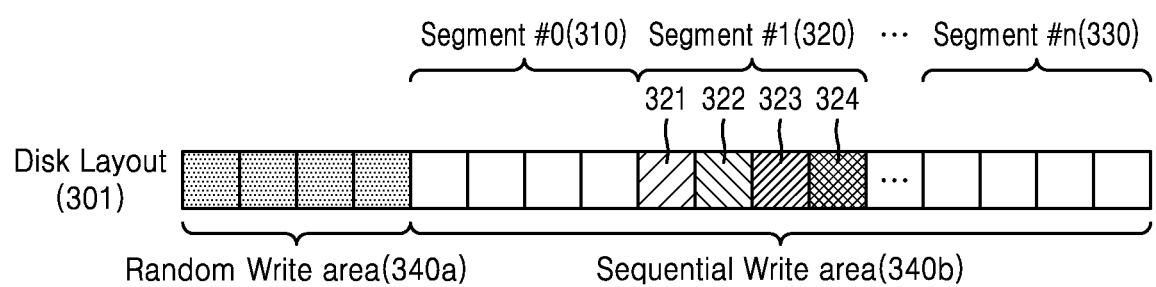
FIG. 3 shows an example where a host device performs sequential write, according to an embodiment.

Referring to FIG. 3, the host device 100 using the LFS may sequential write operations 321, 322, 323, and 324 on several file data into one segment 320. In a disk layout 301 of FIG. 3, a random write area 340a and a sequential write area 340b may represent predefined areas in the F2FS.

Figure 2:
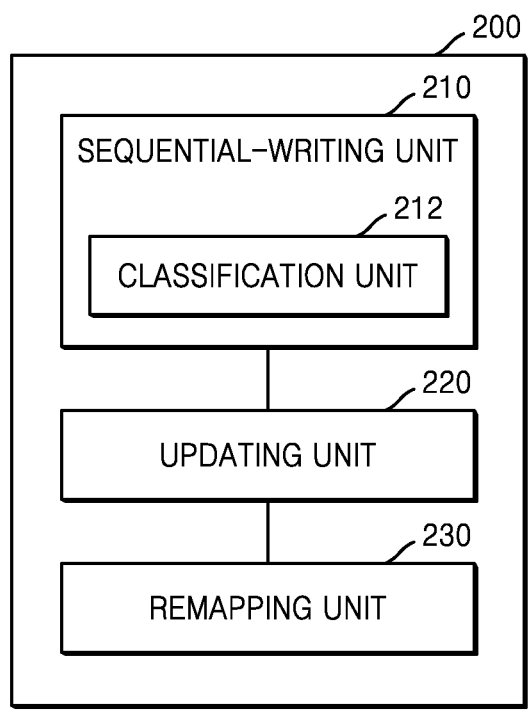
FIG. 2 is an internal structural diagram of file system according to an embodiment.

FIG. 2 is an internal structural diagram of file system according to an embodiment. A file system 200 may include a sequential-writing unit 210, an updating unit 220, and a remapping unit 230. The sequential-writing unit 210 may be implemented in a host, and the updating unit 220 and the remapping unit 230 may be implemented in a storage connectable to the host.

The sequential-writing unit 210 may sequentially write a new block or updated block to a block in a segment. The sequential-writing unit 210 may further include a classification unit 212 that separately manages hot segments and cold segments.

For an operation to write a new block, such as "Append-Block-Operation", the sequential-writing unit 210 may place the new block in a cold segment. Also, for an operation to update a block, such as "Update-Block-Operation", the sequential-writing unit 210 may place an update block in a hot segment. As update blocks in a hot segment are deleted by address-remapping within a short period of time, segment cleaning overhead may be minimized.

Figure 7:
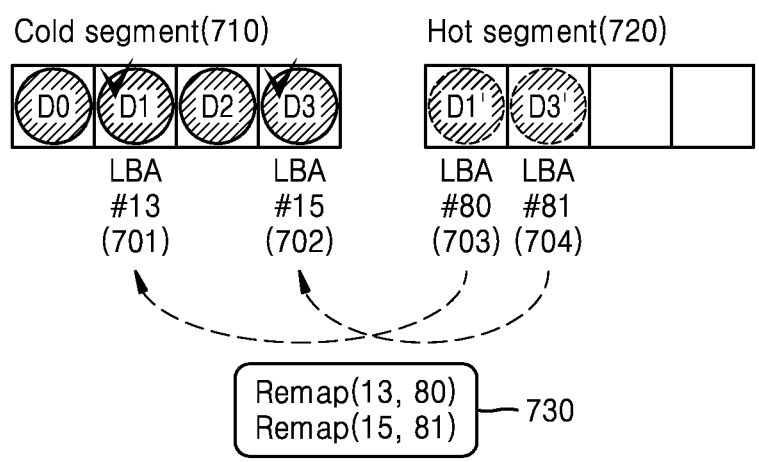
FIG. 7 shows an example where a sequential write unit separately arranges a data block as a hot segment and a cold segment, according to an embodiment.

Referring to FIG. 7, the sequential-writing unit 210 may place new blocks D0, D1, D2, and D3 in a cold segment 710. Then, the new blocks D0, D1, D2, and D3 may be sequentially written in the cold segment 710. When D1 701 is updated to D1' 703 and D3 702 is updated to D3' 704, the sequential-writing unit 210 may place the update blocks D1' 703 and D3' 704 to a hot segment. Then, the sequential-writing unit 210 may sequentially write D1' 703 and D3' 704 in the hot segment.

The updating unit 220 may update a logical page number newly allocated to a new block position in the hot segment in which an update block is written, and a newly allocated physical page number to update a page mapping table.

The remapping unit 230 may apply a remap command to modify the page mapping table such that the logical page number newly allocated to the new block location is changed to a logical page number previously allocated to a data block.

Figure 4:
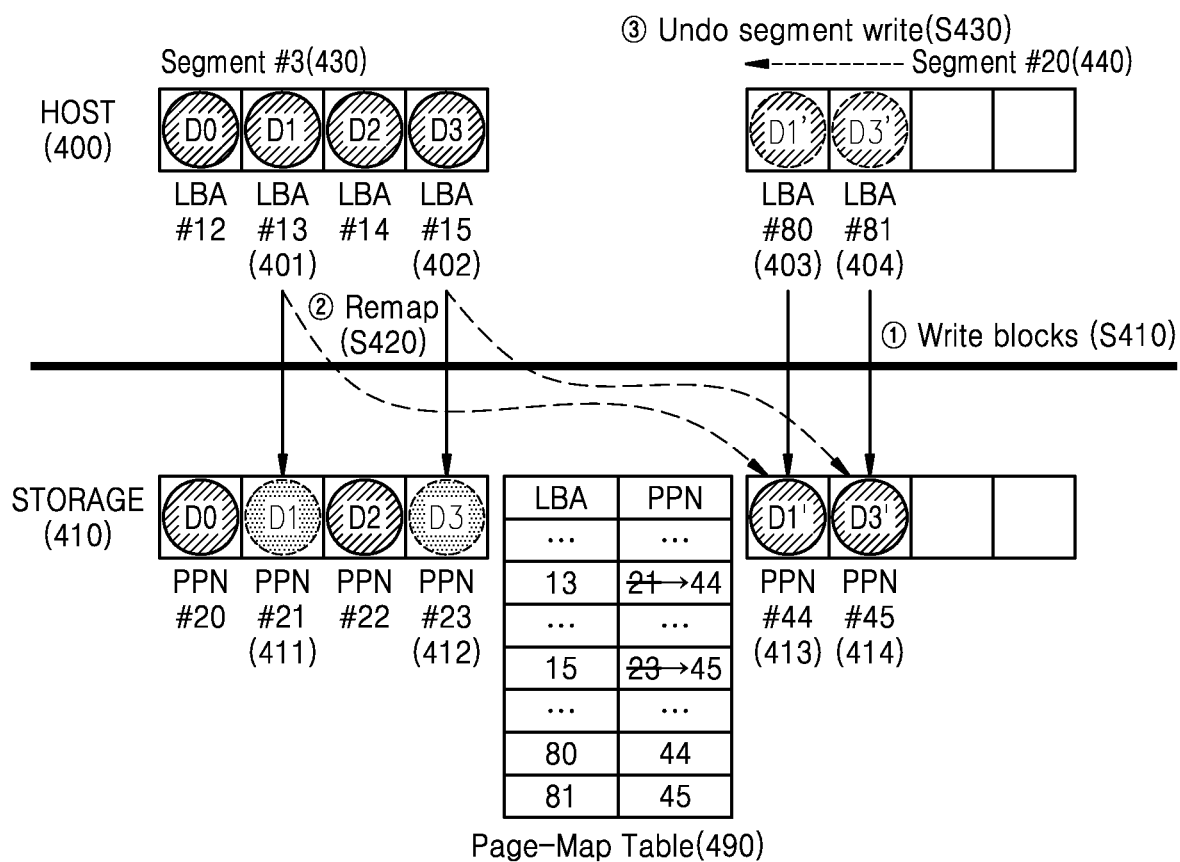
FIG. 4 shows an example where a log-structured file system (LFS) performs a random update, according to an embodiment.

Further description is made with reference to FIG. 4. FIG. 4 shows an example where an LFS performs a random update, according to an embodiment.

It is assumed that a file includes data blocks D0, D1, D2 and D3. Logical page numbers LBA #12 to #15 may be respectively allocated to the data blocks D0, D1, D2, and D3. In the page mapping table 490 inside a storage 410, physical page numbers PPN #20 to #23 corresponding to logical page numbers LBA #12 to #15 are allocated and stored. In this case, the logical page number LBA #13 of the data block D1 may point to PPN #21, and the logical page number LBA #15 of the data block D3 may point to PPN #23. In an embodiment, a segment #3 430 in which new data blocks D0, D1, D2, and D3 are placed may be a hot segment.

It is assumed that update occurs in D1 410 and D3 402 among data blocks of a file stored in the segment #3 430. When updating D1 410 and D3 402, the sequential-writing unit 210 may sequentially write D1' 403 and D3' 404 to a new block position in a currently used or new segment in operation S410. The updating unit 220 may newly allocate a logical page number LBA #80 to D1' 403 and a logical page number LBA #81 to D3' 404 in the page mapping table 490 in the storage 410, respectively. In an embodiment, a segment #20 440 in which data blocks D1' 403 and D3' 404 are placed may be a cold segment.

In the storage 410, physical page numbers PPN #44 and #45 may be newly allocated to D1' 413 and D3' 414, respectively, which are then written. In addition, the updating unit 220 may map the logical page numbers LBA #80 and LBA #81 newly allocated to new block positions in the segment #20 440 and the physical page numbers PPN #44 and #45 newly allocated to new block positions in a physical page of the storage 410 to update the page mapping table 490.

The remapping unit 230 may perform a remap command to remap the logical page numbers LBA #80 and LBA #81 of D1' 413 and D3' 414 to the original positions, the logical page numbers LBA #13 and LBA #15. In other words, the remapping unit 230 may remap the logical page numbers LBA #80 and LBA #81 newly allocated to the update blocks D1' 413 and D3' 414 to the logical page numbers LBA #13 and LBA #15 previously allocated to D1 401 and D3 402 before the update blocks D1' 413 and D3' 414 are updated, in operation S420. The logical page numbers LBA #13 and LBA #15 may indicate the update blocks D1' 413 and D3' 414.

In this case, a host 400 may transmit remap commands Remap (13, 80) and Remap (15, 81) to the storage 410. For a plurality of update blocks, with one remap command, a logical page number newly allocated to each of a plurality of new block positions at which the plurality of update blocks are written may be remapped to a logical page number previously allocated to each data block before the plurality of update blocks are updated. For example, as shown in an example of FIG. 7, Remap(13, 80) and Remap(15, 81) may be transmitted as one remap command 730. When the remap command is executed, the LFS used by the host 400 may invalidate LBA #80 and LBA #81 in the segment #20 440, in operation S430. As D1' 403 and D3' 404 are placed in the hot segment, they may immediately become free segments without garbage collection. Therefore, overhead in segment cleansing may be reduced.

As an embodiment, the file system 200 may perform a remap command only for a specific file. For example, the file system 200 may perform the remap command for a file having a size greater than a preset size and random updates occurring more frequently than a preset number of times. One example of the specific file may be a database file.

Figure 5:
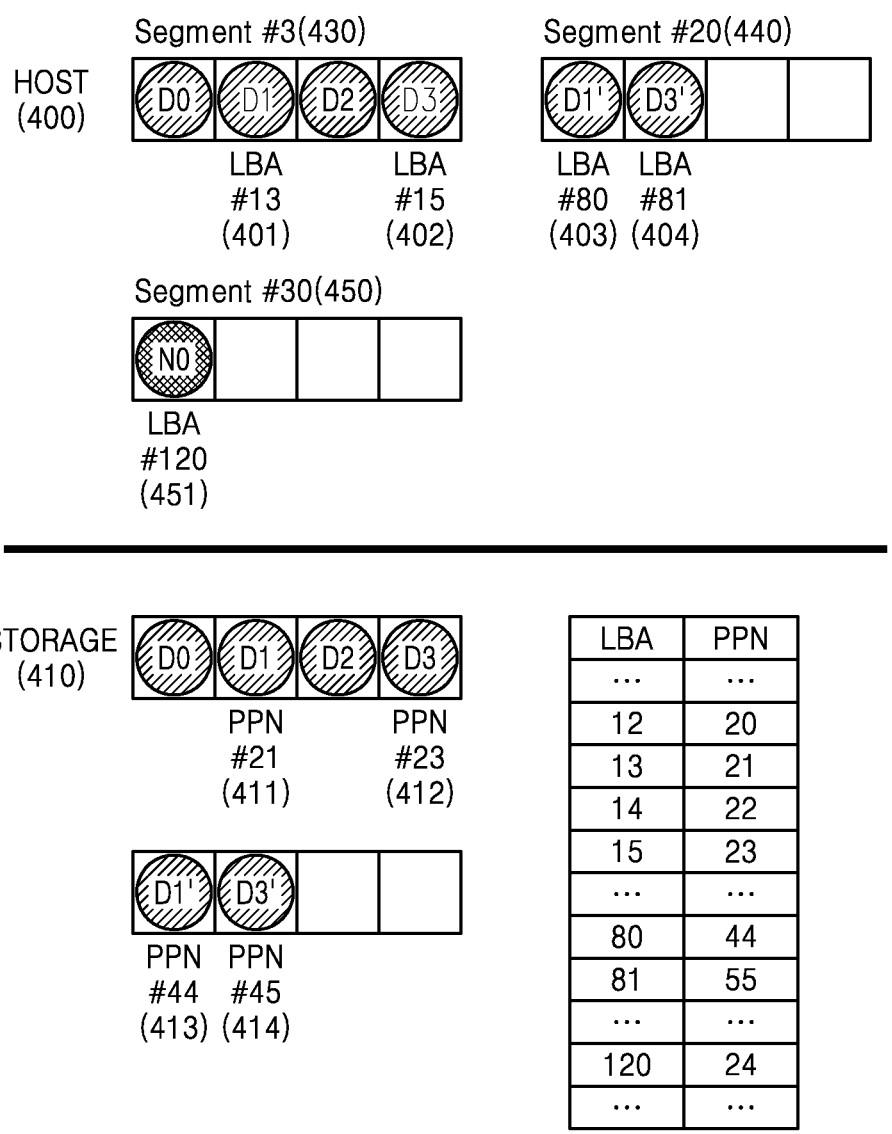
FIGS. 5 and 6 show an example of updating a file in an existing file system.
Figure 6:
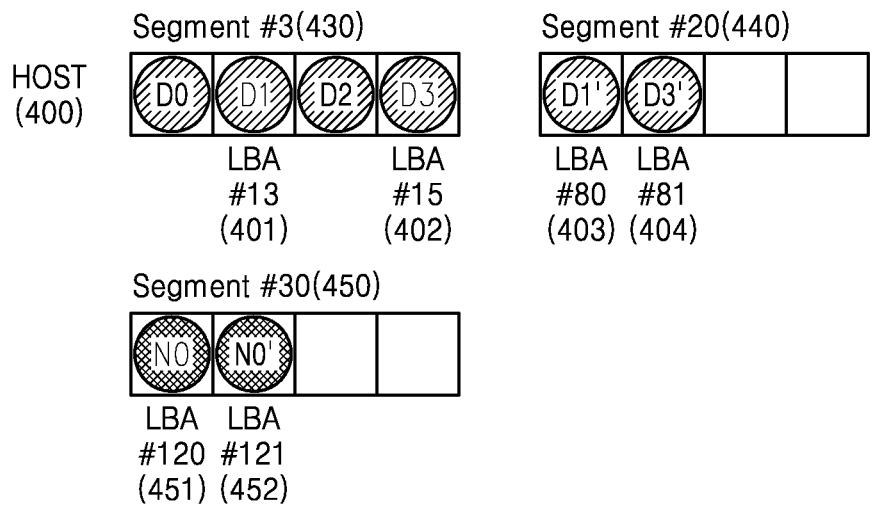
Figure 6:
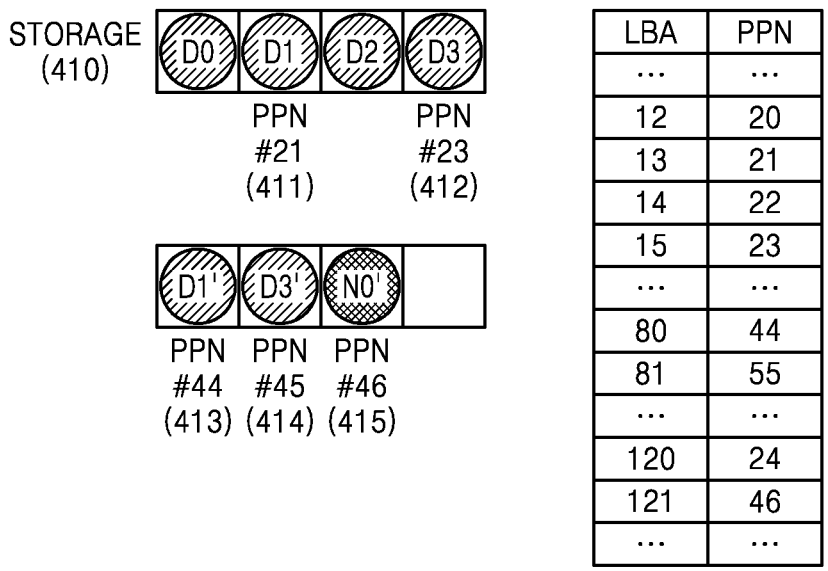

FIGS. 5 and 6 show examples of updating files in an existing file system.

When completing updating of the data blocks D1' 403 and D3' 404, the existing file system may also update a metadata block N0 451 including the logical page numbers LBA #12 to #15 of the data blocks D0, D1, D2, and D3. Assuming that the metadata block N0 451 is written to LBA#120 of a segment #30 450 and written to PPN#24 (not shown) of the storage 410, updated metadata block N0' 452 may be allocated with a new logical page number LBA #121 452 and a new physical page number PPN#46 415, thereby updating the page mapping table accordingly. In addition, the updated metadata block N0' 452 may update the logical page numbers of the data blocks D0, D1', D2, and D3' to LBA #12, #80, #14, and #81. In this process, a file fragmentation problem may occur.

However, in the file system proposed in the disclosure, the logical page numbers of the data blocks D0, D1', D2, and D3' may be maintained as LBA #12 to #15 even after updating of the data blocks D1' 403 and D3' 404 is completed, such that updating of a corresponding metadata block is not required. Accordingly, metadata block overhead may be reduced.

FIG. 8 is a flowchart of updating a file in a file system, according to an embodiment.

In an embodiment, when updating a data block, a host device using the file system may perform sequential write to a new block position of a segment in operation S810. An updating unit may map a logical page number newly allocated to a new block position and a physical page number newly allocated corresponding thereto to update a page mapping table inside a storage, in operation S820. The page mapping table may be modified by applying a remap command to the storage to remap the logical page number newly allocated to the new block position to the logical page number previously allocated to the data block before updating, in operation S830.

The apparatus described above may be implemented by a hardware element, a software element, and/or a combination of the hardware element and the software element. For example, the apparatus and elements described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing components and/or a plurality of types of processing components. For example, the processing device may include a plurality of processors or one processor and one controller. Alternatively, other processing configurations such as parallel processors may be possible.

The method according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as a hard disk, a floppy disk, and magnetic tape, optical media such as a compact disk read only memory (CD-ROM) and a digital versatile disk (DVD), magneto-optical media such as a floptical disk, and a hardware device especially configured to store and execute a program command, such as read only memory (ROM), random access memory (RAM), flash memory, etc. Examples of the program command may include not only machine language code created by a compiler, but also high-level language code executable by a computer using an interpreter.

While embodiments have been described by the limited embodiments and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved. Therefore, other implementations, other embodiments, and equivalents to the claims may also fall within the scope of the claims provided below.

As an embodiment, a method of updating a file in a file system may remap a logical page number of an updated block to a position of a logical page number of an existing block before updating by using a remap command while performing update to a new block position as in an LFS. In this way, it is possible to solve a problem of having to further update a metadata block due to a change of a logical page number while simultaneously using an advantage of sequential write of the LFS. Moreover, as the logical page number is not changed, a file fragmentation problem may be solved.

In an embodiment, an update operation for a data block is placed in a hot segment, and a new write operation is separately placed in a cold segment, thereby reducing segment cleaning overhead.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of updating a file in a file system using a remap command, the method comprising:
    placing, by at least one processor, a new block in a cold segment and an update block in a hot segment, and performing sequential write respectively on the new block and the update block;
    updating, by the at least one processor, a page mapping table by mapping a logical page number newly allocated to a new block position in the hot segment where the update block is written and a physical page number newly allocated corresponding thereto; and
    modifying, by the at least one processor, the page mapping table by applying the remap command to remap the logical page number newly allocated to the update block to a logical page number previously allocated before the update block is updated.

2. The method of claim 1, wherein the hot segment is invalidated after applying the remap command.

3. The method of claim 1, wherein, when there is a plurality of update blocks,
    with one remap command, a logical page number newly allocated to each of a plurality of new block positions in the hot segment where the plurality of update blocks are written is remapped to each logical page number previously allocated to a data block before the plurality of update blocks are updated.

4. A method of updating a file in a file system using a remap command, the method comprising:
    performing, at least one processor, sequential write to a new block position of a segment when updating a data block;
    updating, by the at least one processor, a page mapping table by mapping a logical page number newly allocated to the new block position and a physical page number newly allocated corresponding thereto; and
    modifying, by the at least one processor, the page mapping table by applying the remap command to a storage to remap the logical page number newly allocated to the new block position to a logical page number previously allocated to the data block,
    wherein, subsequent to the updating of the data block, the remap command is performed before a metadata block that records a change of a logical page number of the new block position is updated.

5. The method of claim 4, wherein the at least one processor separately manages a hot segment and a cold segment.

6. The method of claim 4, wherein, when the at least one processor updates the data block, the segment is a hot segment.

7. The method of claim 6, wherein the hot segment is invalidated after the remap command is applied.

8. The method of claim 4, wherein the at least one processor places a new block in a cold segment.

9. A file system using a remap command comprising:
    at least one processor configured to:
        perform sequential write to a new block position of a segment when updating a data block;
        update a page mapping table by mapping a logical page number newly allocated to the new block position and a physical page number newly allocated corresponding thereto; and
        modify the page mapping table by applying the remap command to a storage to remap the logical page number newly allocated to the new block position to a logical page number previously allocated to the data block,
        wherein, subsequent to the updating of the data block, the remap command is performed before a metadata block that records a change of a logical page number of the new block position is updated.

10. The file system of claim 9, wherein the at least one processor is further configured to separately manage a hot segment and a cold segment.

11. The file system of claim 9, wherein, when the at least one processor updates the data block, the segment is a hot segment.

12. The file system of claim 11, wherein the hot segment is invalidated after the remap command is applied.

13. The file system of claim 9, wherein the at least one processor is further configured to place a new block in a cold segment.

* * * * *